US009477942B2

(12) United States Patent
Adachi et al.

(10) Patent No.: US 9,477,942 B2
(45) Date of Patent: *Oct. 25, 2016

(54) COLLABORATIVE DATA ENTRY

(75) Inventors: Hisatoshi Adachi, Kanagawa (JP); Masato Noguchi, Kanagawa (JP); Masaki Wakao, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 615 days.

This patent is subject to a terminal disclaimer.

(21) Appl. No.: 12/521,557

(22) PCT Filed: Dec. 21, 2007

(86) PCT No.: PCT/JP2007/074755
§ 371 (c)(1),
(2), (4) Date: Jun. 26, 2009

(87) PCT Pub. No.: WO2008/084665
PCT Pub. Date: Jul. 17, 2008

(65) Prior Publication Data
US 2010/0333012 A1    Dec. 30, 2010

(30) Foreign Application Priority Data
Dec. 28, 2006 (JP) .................... 2006-353887

(51) Int. Cl.
G06Q 10/10    (2012.01)
G06Q 10/06    (2012.01)

(52) U.S. Cl.
CPC ........... *G06Q 10/10* (2013.01); *G06Q 10/06* (2013.01)

(58) Field of Classification Search
CPC ............................ G06Q 10/10; G06Q 10/06
USPC ........................................... 715/780
See application file for complete search history.

(56) References Cited

U.S. PATENT DOCUMENTS

2005/0267792 A1* 12/2005 Mehrotra et al. ................ 705/9
2006/0224951 A1* 10/2006 Burke et al. .................. 715/513
2009/0119601 A1*  5/2009 Adachi et al. ................ 715/753

FOREIGN PATENT DOCUMENTS

| JP | 2002-279166 A | 9/2002 |
| JP | 2003-280946 A | 10/2003 |
| JP | 2004334379 | 11/2004 |
| JP | 2005-321937 A | 11/2005 |
| JP | 2006079469 | 3/2006 |
| JP | 2006236003 | 9/2006 |

OTHER PUBLICATIONS

European Search Report based off of PCT/JP2007/074755 for corresponding EP Patent Application No. 07859985; Dec. 27, 2010.
Amtsblatt EPA / Official Journal EPO / Journal officiel OEB.
Statement in accordance with the Notice from the European Patent Office dated Oct. 1, 2007 concerning business methods.
Canadian Intellectual Property Office; Office Action Dated Aug. 8, 2014 on Corresponding Canadian Patent Application No. 2672563; 4 Pages.

* cited by examiner

*Primary Examiner* — Angie Badawi
(74) *Attorney, Agent, or Firm* — Steven L. Nichols; Fabian VanCott

(57) ABSTRACT

A method for collaborative data entry in which a primary user enters data into an input terminal includes data being entered into a number of input fields on an input screen by the primary user. The input terminal has an interface for assigning entry of data into at least one of the input fields to an alternate user. The method includes, with the interface, assigning entry of data into at least one of the input fields to an alternate user. An apparatus allowing collaborative data entry includes an input terminal comprising a display device for displaying data to a user and a user input device for receiving input from a user; and a user interface of the input terminal, the interface comprising a number of input fields for receiving the input from a user and for assigning at least one the input field to an alternate user.

13 Claims, 15 Drawing Sheets

REIMBURSEMENT REQUEST

INPUT DETAILS  _1310_

| CONFIRM REQUEST | HOLD | GO TO LIST | RETURN TO MENU | GUIDE |

LOGGED-IN EMPLOYEE'S ID NUMBER: AA123456  REQUESTING EMPLOYEE'S ID NUMBER: AA123456  NAME: ICHIRO YAMADA

BILLED DEPARTMENT :SIXYZI

TRANSPORTATION EXPENSES [ADD D... ▼]  _1320_  WHAT/FOR: TRAVELING EXPENSES: TRANSPORTATION EXPENSES: LODGING EXPENSES: / ORDINARY, DOMESTIC /ORDINARY

DATE OF EXPENSE: YEAR [2006] ▼  ...ATION EXPENSES [INPUT ALLOWANCES] [INPUT OTHERS]

ROUTE:  ...ORTATION: —————— SELECT —————— ▼

CONTENT OF REQUEST: FOR EDITING  L ROUTE —————— SELECT PERSONAL ROUTE —————— ▼

AMOUNT/DISTANCE [ONE]  NU => REQUEST REIMBURSEMENT=> REGISTER/MODIFY PERSONAL ROUTE

DETAILS DISPLAY RANGE  TOTAL AM...  ...in - Sub -CTax  1234 - 0000 - xx

USING PRIVATE CAR: KM

| A PERSON OF INPUT |
|---|
| ⊟ Kawamura |
|   Hosaka |
|   Tateno |
| ⊟ Kawamura |
| ⊟ Okano |
| ⊟ Takemaki |
| ⊟ Yoshino |
| ⊟ Furuta |
| ⊟ Kohmura |
| ⊟ Tachikawa |
| ⊟ Saitoh |

| | DATE OF EXPENSE | | ...XPENSES | REMARKS | AMOUNT | DISTANCE | Evd | Min - Sub - CTax |
|---|---|---|---|---|---|---|---|---|
| SELECT 6 | 09/28 | | Y | | 440 | | | 1234 - 5678 - A5 |
| SELECT 5 | 09/28 | | Y | | 510 | | | 1234 - 5678 - A5 |
| SELECT 4 | 10/13 | | Y | | 440 | | | 1234 - 5678 - A5 |
| SELECT 3 | 10/13 | CHUOHRINKAN - SUITENGUMAE | RAILWAY | | 510 | | | 1234 - 5678 - A5 |
| SELECT 2 | 10/20 | CHUOHRINKAN - SHINTOMICHO | RAILWAY | | 510 | | | 1234 - 5678 - A5 |
| SELECT 1 | 10/20 | SHINTOMICHO - KITAMI | RAILWAY | | 490 | | | 1234 - 5678 - A5 |

REIMBURSEMENT REQUEST

INPUT DETAILS 1410

| CONFIRM REQUEST | HOLD | GO TO LIST | RETURN TO MENU | GUIDE |

LOGGED-IN EMPLOYEE'S ID NUMBER: AA123456  Yoshino  REQUESTING EMPLOYEE'S ID NUMBER: AA123456  NAME: ICHIRO YAMADA BILLED DEPARTMENT: 新大阪 [▼] MODIFY A/C Div-MA1: K9-D01 [▼]  WHAT FOR: TRAVELING EXPENSES: TRANSPORTATION EXPENSES: LODGING EXPENSES: / ORDINARY, DOMESTIC /ORDINARY TRANSPORTATION EXPENSES | ADD DETAILS   INPUT TRANSPORTATION EXPENSES | INPUT ALLOWANCES | INPUT OTHERS DATE OF EXPENSE: YEAR [2006 ▼] MONTH [09 ▼] - [ ]   MEANS OF TRANSPORTATION: [————— SELECT —————▼]

ROUTE:   REVERSE | ADD PERSONAL ROUTE |   SELECT PERSONAL ROUTE [————▼]

FOR EDITING THE PERSONAL ROUTE, SELECT: "APPLICANT'S MENU=> REQUEST REIMBURSEMENT=> REGISTER/MODIFY PERSONAL ROUTE"

CONTENT OF REQUEST: [    ] (ONE WAY)  ☐ ROUND TRIP  ☐ EVIDENCE: ☐  Min - Sub - CTax  1234 - 0000 - xx

AMOUNT/DISTANCE: [    ]    TOTAL AMOUNT BILLED: 2,000 YEN   TOTAL DISTANCE MOVED USING PRIVATE CAR: KM

REMARKS:

[DETAILS DISPLAY RANGE]

| | | DATE OF EXPENSE | ROUTE | CONTENT OF EXPENSES | REMARKS | AMOUNT | DISTANCE | Exc | Min - Sub - CTax |
|---|---|---|---|---|---|---|---|---|---|
| SELECT | 6 | 09/28 | KITAMI - SUITENGUMAE | RAILWAY | | 440 | | | 1234 - 5678 - A5 |
| SELECT | 5 | 09/28 | SUITENGUMAE - CHUOHRINKAN | RAILWAY | | 510 | | | 1234 - 5678 - A5 |
| SELECT | 4 | 10/13 | SUITENGUMAE - KITAMI | RAILWAY | | 440 | | | 1234 - 5678 - A5 |
| SELECT | 3 | 10/13 | CHUOHRINKAN - SUITENGUMAE | RAILWAY | | 510 | | | 1234 - 5678 - A5 |
| SELECT | 2 | 10/20 | CHUOHRINKAN - SHINTOMICHO | RAILWAY | | 510 | | | 1234 - 5678 - A5 |
| SELECT | 1 | 10/20 | SHINTOMICHO - KITAMI | RAILWAY | | 490 | | | 1234 - 5678 - A5 |

REIMBURSEMENT REQUEST

INPUT DETAILS

| CONFIRM REQUEST | HOLD | GO TO LIST | RETURN TO MENU | GUIDE |

LOGGED-IN EMP | GO TO NEXT | EMPLOYEE'S ID NUMBER: AA123456  NAME: ICHIRO YAMADA

BILLED DEPART | RESERVE EXECUTION | K9-D01 ▼ | WHAT FOR: TRAVELING EXPENSES; TRANSPORTATION EXPENSES; LODGING EXPENSES; / ORDINARY, DOMESTIC /ORDINARY

TRANSPORTATION EXPENSES | ADD DETAILS | Clear | INPUT TRANSPORTATION EXPENSES | INPUT ALLOWANCES | INPUT OTHERS DATE OF EXPENSE: YEAR 2006 ▼ MONTH 09 ▼ - ▼  MEANS OF TRANSPORTATION: ———— SELECT ———— ▼

ROUTE: REVERSE | ADD PERSONAL ROUTE | ———— SELECT PERSONAL ROUTE ———— ▼

FOR EDITING THE PERSONAL ROUTE, SELECT: "APPLICANT'S MENU=> REQUEST REIMBURSEMENT=> REGISTER/MODIFY PERSONAL ROUTE"

CONTENT OF REQUEST:       REMARKS:

AMOUNT/DISTANCE         □ (ONE WAY)  □ ROUND TRIP  0  Min - Sub - CTax  1234 - 0000 - xx

[DETAILS DISPLAY RANGE]  TOTAL AMOUNT BILLED: 2,000 YEN  TOTAL DISTANCE MOVED USING PRIVATE CAR: KM

|   | DATE OF EXPENSE | ROUTE | CONTENT OF EXPENSES | REMARKS | AMOUNT | DISTANCE | Ed | Min - Sub - CTax |
|---|---|---|---|---|---|---|---|---|
| SELECT 6 | 09/28 | KITAMI - SUITENGUMAE | RAILWAY | | 440 | | | 1234 - 5678 - A5 |
| SELECT 5 | 09/28 | SUITENGUMAE - CHUOHRINKAN | RAILWAY | | 510 | | | 1234 - 5678 - A5 |
| SELECT 4 | 10/13 | SUITENGUMAE - KITAMI | RAILWAY | | 440 | | | 1234 - 5678 - A5 |
| SELECT 3 | 10/13 | CHUOHRINKAN - SUITENGUMAE | RAILWAY | | 510 | | | 1234 - 5678 - A5 |
| SELECT 2 | 10/20 | CHUOHRINKAN - SHINTOMICHO | RAILWAY | | 510 | | | 1234 - 5678 - A5 |
| SELECT 1 | 10/20 | SHINTOMICHO - KITAMI | RAILWAY | | 490 | | | 1234 - 5678 - A5 |

COLLABORATIVE DATA ENTRY

RELATED APPLICATIONS

The present application is filed under 35 U.S.C. §371 as a national stage submission of International Application No. PCT/JP2007/074755, which has an international filing date of Dec. 21, 2007 and a priority date of Dec. 28, 2006. Accordingly, the present application claims a priority filing date of Dec. 28, 2006 pursuant to 35 U.S.C. §119(a) and 365(b).

BACKGROUND

Modern enterprise systems generally have web application systems installed. For example, in a reimbursement processing system using such web application systems, an employee may enter a route, traveling expenses, lodging expenses, accounting codes and other information into input fields in a web browser. The entered data is transmitted to a reimbursement processing application server for execution of the reimbursement processing.

If an employee of a company having such an enterprise system is unsure or has forgotten any input information (for example, the accounting code) necessary for any reimbursement processing, the employee must use a collaboration tool such as an electronic mail or instant messaging program to confirm the input information with another employee in order to accomplish the reimbursement processing.

However, such confirmation jobs associated with data inputs by the employees may lead to a considerable cost for the company as a whole. It will be appreciated from the foregoing that there is a need for an information system that does not require such plain and troublesome confirmation jobs as described above.

Japanese Unexamined Patent Publication (Kokai) No. 2005-321937 discloses a part information management system aiming at enhancing efficiency in the input of parts information. In the system, a part code management server receives an input request of part information for a new part and, in accordance with an instruction of a manager, transmits an electronic mail requesting input of part information to a vendor corresponding to the part that is an input object. Each vendor, in receipt of the electronic mail, accesses a mediation server from the vendor terminal. The mediation server provides the accessed vendor with a corresponding part information input screen. Each vendor performs input of the part information of the requested part from the part information input screen. The inputted part information is managed by the mediation server, and is registered in the part code management server after being confirmed by the manager.

Japanese Unexamined Patent Publication (Kokai) No. 2002-279166 discloses a system allowing a user to readily obtain his/her desired household account book data without the need to access a data providing mechanism related to the user him/herself. In the system, a service request from a user terminal regarding the household account book data is received at a service agent server. In the service agent server, requested data desired by the user is requested of the data providing mechanism, such that the service agene server collects the requested data from the data providing mechanism with the inquiry. The collected data is edited to household account book data desired by the user, which is then delivered to the user terminal. After the collection of the data desired by the user is finished, the completion of the service is informed from the user terminal to the service agent server, and the edited household account book data is erased.

BRIEF SUMMARY

A method for collaborative data entry in which a primary user enters data into an input terminal includes data being entered into a number of input fields on an input screen by the primary user. The input terminal has an interface for assigning entry of data into at least one of the input fields to an alternate user. The method includes, with the interface, assigning entry of data into at least one of the input fields to an alternate user.

An apparatus allowing collaborative data entry includes an input terminal comprising a display device for displaying data to a user and a user input device for receiving input from a user; and a user interface of the input terminal, the interface comprising a number of input fields for receiving the input from a user and for assigning at least one the input field to an alternate user A computer program product for collaborative data entry in which a primary user enters data into a number of input fields on an input terminal and solicits data from an alternate user for input into at least one of the input fields, includes computer-readable instructions stored on a physical, computer-readable medium, the instructions causing a computer to display a user interface comprising the input fields to the primary user and accept assignment by the primary user of at least one of the input fields as to be filled with data obtained from the alternate user.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 13 is an example of an interface including a selection list for designating a delegate user, according to one embodiment of the present invention;

FIG. 14 is an example of an input screen on which marking of a designated delegate user is made, according to one embodiment of the present invention;

FIG. 15 is an example of an interface for inputting selection of either "GO TO NEXT SCREEN" or "EXECUTION RESERVATION," according to one embodiment of the present invention; and FIG. 16 is an example of an input screen on which only the input field to be entered by a delegate is made to accept the input, according to one embodiment of the present invention.

Throughout the drawings, identical reference numbers designate similar, but not necessarily identical, elements.

DETAILED DESCRIPTION

Figure 1:
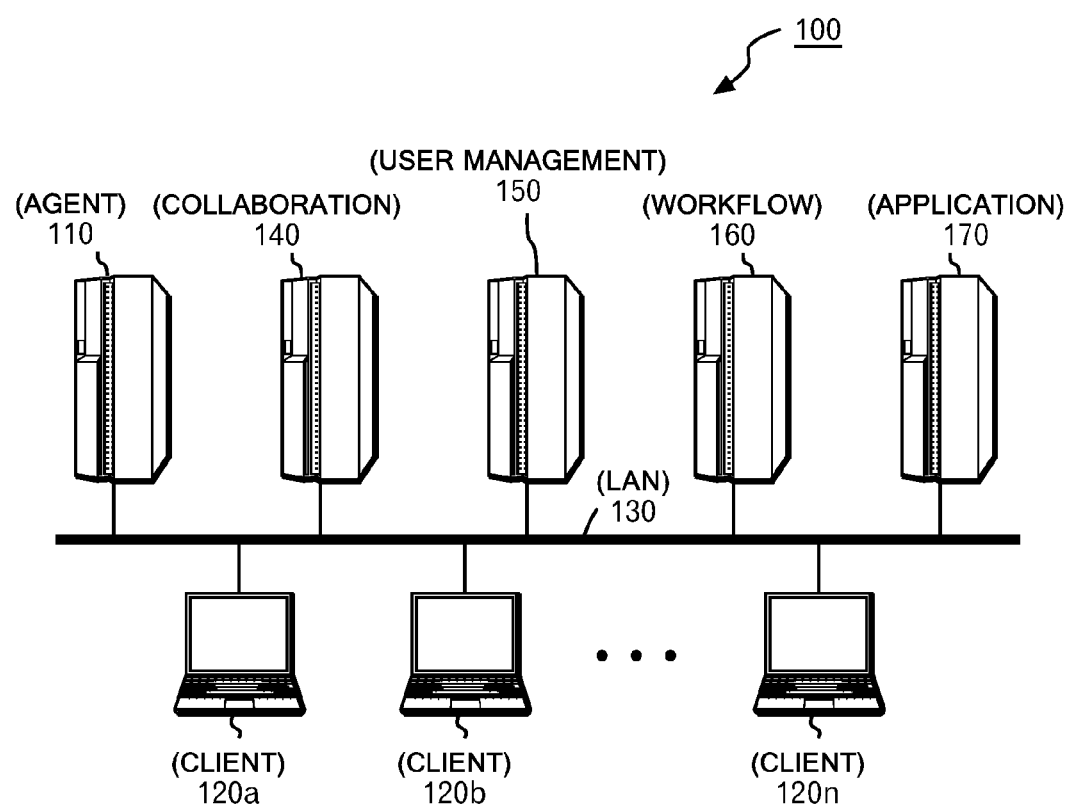
FIG. 1 is a high-level, overall schematic diagram of a data processing system, according to one embodiment of the present invention.

In order to delegate the task of entering any data into an input field of an existing web application to another person, it might be necessary to prepare a workflow process template in advance or revise the existing web application. This leads to a lack of flexibility in the system configuration. As such, with the background technologies, it is not possible to delegate the entering of information into input fields for an existing web application.

In view of the foregoing, the present specification provides improvement in a method and program product for supporting data input for business processing in an application server. In order to achieve this, the present specification provides a method for supporting data input necessary for performing business processing in a data processing system. The data processing system includes an input terminal and a delegate terminal. The data processing system may be connected to an application server performing the business processing.

The method includes a set of steps to be performed at the input terminal and a set of steps to be performed at the delegate terminal. At the input terminal the steps include: starting recording of user input at the input terminal, displaying a screen containing one or more input fields for data necessary for the business processing, the screen including an interface for designating a delegate user for at least one of the input fields; and receiving from the input user a designation of the delegate user for at least one of the input fields.

At the delegate terminal, the steps include: starting reproduction processing of operations performed at the input terminal by using an input reproduction file being created based on the recording of the terminal operation of the input user; stopping the reproduction processing and prompting the delegate user to enter data into the input field assigned to the delegate user; receiving the data entered into the delegated input field or fields by the delegate user; and transmitting the entered data from the delegate user to the data processing system.

While the present technique has been outlined above as a method, it will also be understood as a data processing system, a program, or a program product. For example, the program product may include a storage medium having the program stored therein, or may include a medium for transmitting the program.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a high-level, overall schematic diagram of an in-house network system (100), according to one embodiment of the present invention. The system (100) includes an agent server (110), clients (120a, 120b, ..., 120n) (herein, collectively referred to as the "client(s) (120)"), a collaboration server (140), a user management server (150), a workflow server (160), and an application server (170), which are connected to each other via a network (130).

The agent server (110) receives a designation for a delegate user for at least one input field included in a screen for entering data necessary for the application server (170) from an input user terminal (120a). In response, the agent server (110) generates an instruction to generate a workflow process which includes a delegate input task to be performed by the delegate user. The agent server (110) then transmits the instruction to the workflow server (160) to generate the workflow process. Further, the agent server (110) provides the delegate user with an interface for performing the delegate input task. Furthermore, the agent server (110) uses the data entered by the delegate user through the delegate terminal to carry out processing on behalf of the application server (hereinafter, referred to as "delegate processing"). The functions and operations of the agent server (110) will be described in detail later.

The client (120) may be a personal computer provided for a respective user. The client (120) is provided with a web browser, which allows the user to interact with another computer connected to the network (130) via the browser. In one embodiment of the present technique, a plug-in for the browser is downloaded from the agent server (110) and installed on the client (120). The plug-in will add an advanced function which will be described in detail later.

In one embodiment of the present invention, the client (120) may use Internet Explorer™ provided by Microsoft Corporation, Firefox™ provided by Mozilla Corporation or any other web browser. Herein, the client (120) that is operated by a user entering data in pursuit of the reimbursement process for his or herself is referred to as the "input terminal (120a)," whereas the client (120) that is operated by a delegate user entering data input on behalf of the primary user according to their request is referred to as the "delegate terminal (120b)".

The collaboration server (140) provides a service for allowing the employees of the company possessing the network system (100) to collaborate by exchanging information with each other. More specifically, the collaboration server (140) may provide an instant messaging service, an electronic mail service, or any other collaborative service. In one embodiment of the present technique, the agent server (110) can exchange information with the clients (120) using a service provided by the collaboration server (140).

The user management server (150) is responsible for managing information regarding the users of the network system (100), including, e.g., mail addresses and other user Identifications (IDs) and passwords. The user management server (150) provides the information it manages over the network to various applications as appropriate through a published Application Programming Interface (API) and in an appropriate format. The applications may include an instant messaging client and e-mail client software.

The workflow server (160) generates a workflow process based on a segmented task structure created by an agent server (110) from a model structure, and manages the generated workflow process. The contents and details in generation of the model structure, the segmented task structure, and the workflow process created by the workflow server (160) will be described later.

The application server (170) interacts with other computer devices of the system (100) to provide a business service. It may be assumed that the application server (170) provides the exemplary reimbursement processing service of traveling and other expenses necessary for employees to conduct business in the real world.

The network (130) is a communication path connecting the client (120), the agent server (110), and the application server (170). In one embodiment, the network (130) can be implemented as a Local Area Network (LAN). The network (130) may connect computer systems using Transmission Control Protocol/Internet Protocol (TCP/IP), a communication protocol well known to those skilled in the art.

Figure 2:
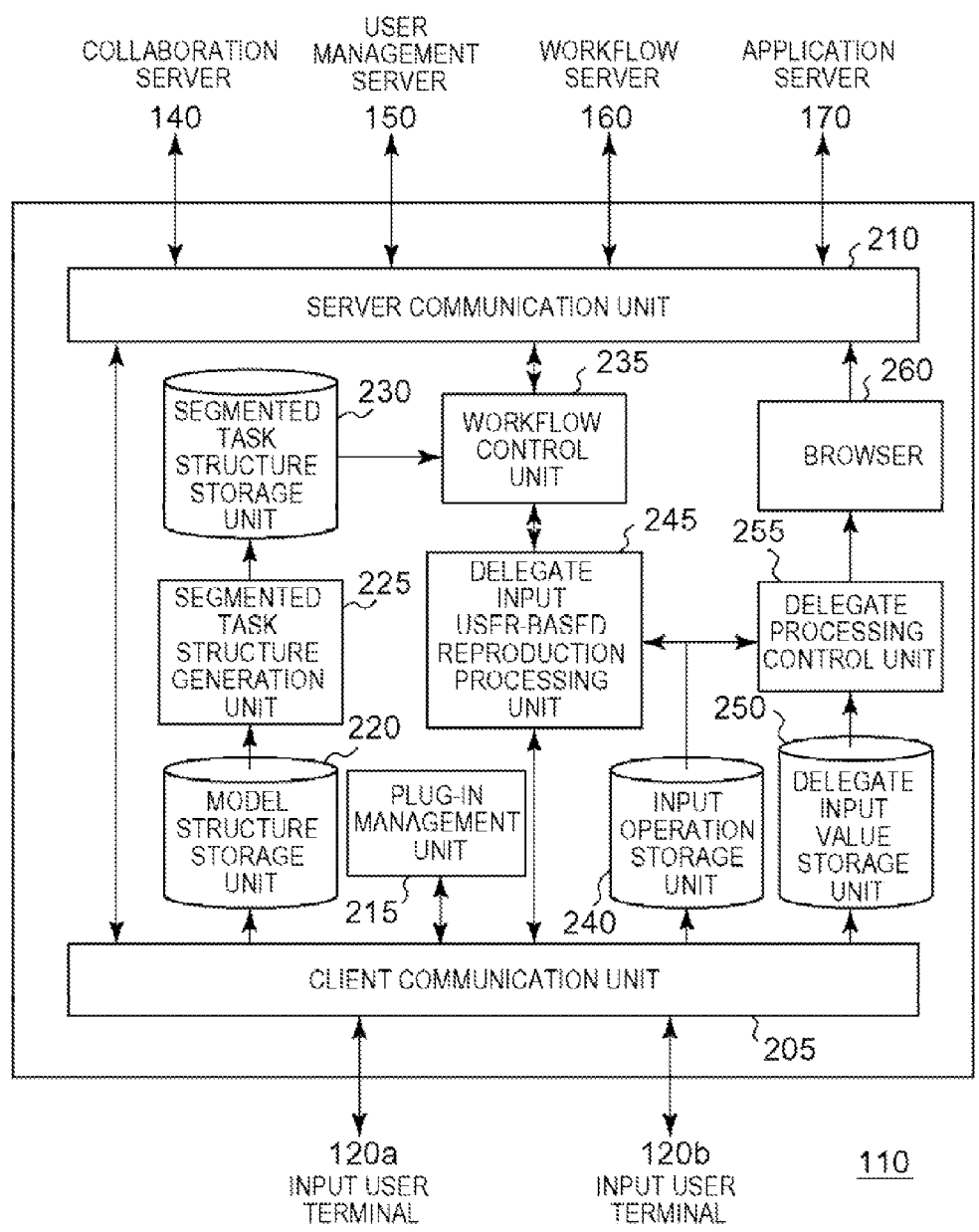
FIG. 2 is a functional block diagram of an agent server, according to one embodiment of the present invention.

FIG. 2 is a functional block diagram of the agent server (110), according to one embodiment of the present technique. The elements shown in the functional block diagrams of both FIG. 2 and FIG. 3 can be implemented in an information processing apparatus having a hardware configuration as will be described later in conjunction with FIG. 9. The processing apparatus will have loaded to a main memory (4) an operating system and a computer program stored on a hard disk drive (13) or other form of non-volatile memory. The processing apparatus will then cause a CPU (1) to read the operating system and computer program thereby causing both the hardware resources and the software to cooperate together.

In one embodiment, the agent server (110) includes a client communication unit (205), a server communication unit (210), a plug-in management unit (215), a model structure storage unit (220), a segmented task structure generation unit (225), a segmented task structure storage unit (230), a workflow control unit (235), an input operation storage unit (240), a delegate user-based reproduction processing unit (245), a delegate input value storage unit (250), a delegate processing control unit (255), and a web browser (260).

The client communication unit (205) provides a function which enables the agent server (110) to communicate with either an input terminal client (120*a*) or a delegate terminal client (120*b*). The server communication unit (210) provides a function which enables the agent server (110) to communicate with a server group connected to the network (130). The server group may include a collaboration server (140), a user management server (150), a workflow server (160), and an application server (170).

The plug-in management unit (215) stores a plug-in program used in collaboration with the web browser of a client (120). In response to a request from the client (120), the plug-in management unit (215) provides the plug-in program to a client (120) through a client communication unit (205).

The model structure storage unit (220) stores a model structure received from the input terminal (120*a*) through the client communication unit (205). The segmented task structure generation unit (225) generates a segmented task structure based on the model structure stored in the model structure storage unit (220). The segmented task structure generated by the segmented task structure generation unit (225) is stored in the segmented task structure storage unit (230). The contents and details in generation of the model structure and the segmented task structure will be described later.

The workflow control unit (235) has a function which generates an instruction to dynamically generate a workflow process. The workflow process includes at least one delegate input task corresponding to a delegate user assigned the input task. The delegate user input task is based on the segmented task structure stored in the segmented task structure storage unit (230). The workflow control unit transmits the generated instruction to the workflow server (160) through the server communication unit (210). When the workflow server (160) receives the instruction, it generates the workflow process and then performs activation of both the workflow process and the managing of the progress of the task(s). The contents and details in generation of the workflow process generated by the workflow server (160) will be described later.

The input operation storage unit (240) stores a recording of input terminal operations performed by a primary user. The input operation storage unit receives the recording via the client communication unit (205). The recording of the terminal operations performed by a primary user and stored in the input operation storage unit (240) is used for reproduction processing by the delegate terminal (120*b*) and for delegate processing by the delegate processing control unit (255).

When the delegate terminal (120*b*), which has received a processing request for a delegate input task, requests an input reproduction file from the delegate user-based reproduction processing unit (245), the delegate user-based reproduction processing unit (245) generates and transmits to the delegate terminal (120*b*) the input reproduction file. The input reproduction file provides a data input interface for an input field assigned to the delegate user.

The delegate input value storage unit (250) stores a delegate input value that was received through the client communication unit (205) from the delegate terminal (120*b*) that performed the delegate input task.

The delegate processing control unit (255) automatically initiates the delegate processing upon completion of all the delegate input tasks. More specifically, the delegate processing control unit (255) generates a delegate processing file based on the recording of the input operations stored in the input operation storage unit (240) and the delegate input values stored in the delegate input value storage unit (250). The delegate processing control unit (255) is also capable of activating the web browser (260) of the agent server (110). A plug-in similar to the one installed onto a client (120) is installed on the web browser (260) of an agent server (110). The delegate processing control unit (255) of the agent server (110) carries out the reimbursement processing by interacting with the application server (170) according to the delegate processing file in the web browser environment containing the plug-in.

Figure 3:
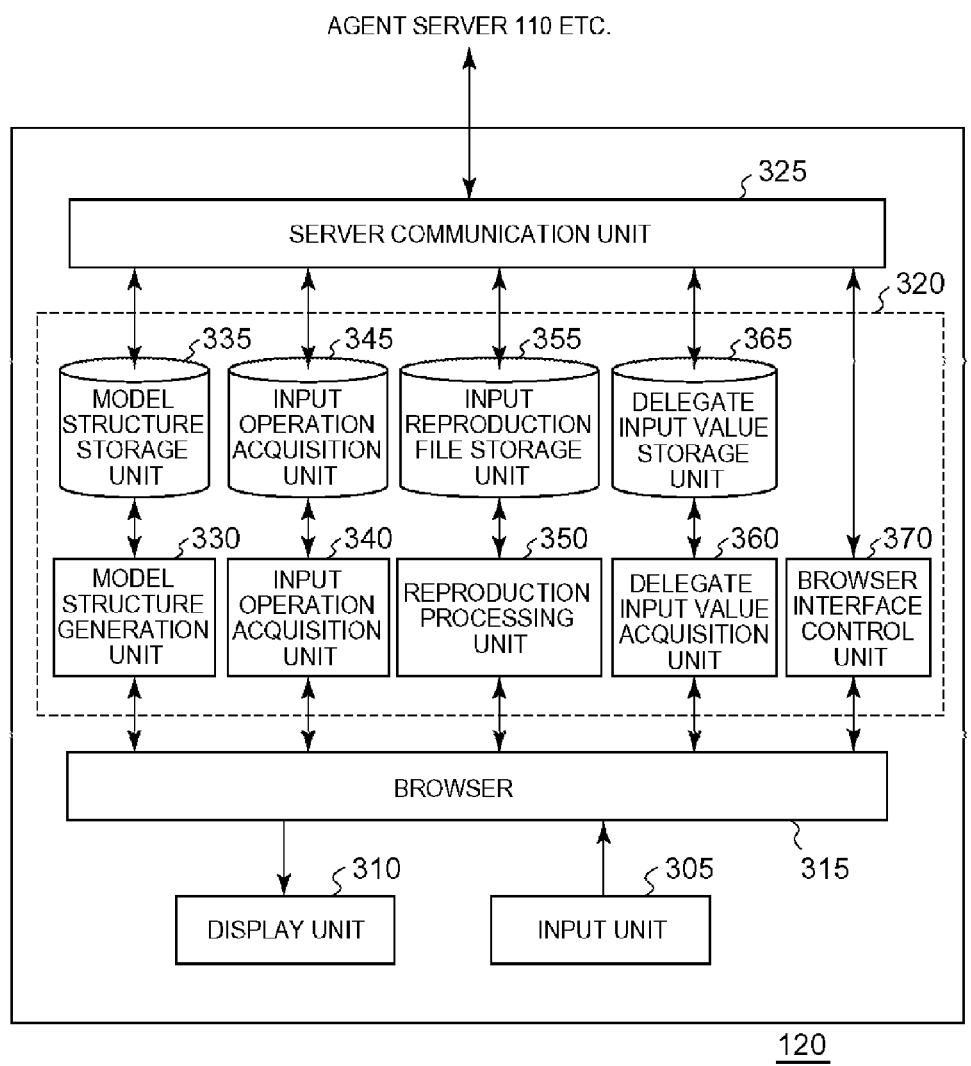
FIG. 3 is a functional block diagram of a client, according to one embodiment of the present invention.

FIG. 3 is a functional block diagram of a client (120) according to one embodiment of the present technique. The client (120) includes an input unit (305), a display unit (310), a web browser (315), a plug-in (320), and a server communication unit (325).

The input unit (305) has a function that receives input from a client (120) user using a keyboard (6) and/or a mouse (7). The display unit (310) has a function that displays information on any display device (11) in order to provide the information to the client (120) user. The server communication unit (325) has a function that communicates with the agent server (110) and other server computers connected to the network (130).

The web browser (315) is a software application used for browsing electronic documents such as web pages. In one embodiment, the web browser (315) may download files from a server and display them in a Hyper Text Markup Language (HTML) or an eXtensible Markup Language (XML) format. A user may transmit data to the server using an input screen displayed on the web browser (315). Further, the web browser (315) can be enhanced in function by installing a small program referred to as a "plug-in" (320).

In one embodiment, the web browser (315) may be one of the existing web browsers, such as Internet Explorer™ provided by Microsoft Corporation or Firefox™ provided by Mozilla Corporation, as explained above.

A plug-in (320) is a small program for providing the web browser (315) with any additional function(s). In one embodiment, the client (120) user downloads and installs a plug-in (320) from the agent server (110). The plug-in technology in and of itself is well known in the technical field of web browsers. Thus, a detailed description thereof will not be provided here.

In one embodiment, the plug-in (320) includes a model structure generation unit (330), a model structure storage unit (335), an input operation acquisition unit (340), an input operation storage unit (345), a reproduction processing unit (350), an input reproduction file storage unit (355), a delegate input value acquisition unit (360), a delegate input value storage unit (365), and a web browser interface control unit (370).

In response to designation of a delegate user input field, the model structure generation unit (330) generates a model structure which includes an input screen ID, an input field ID, and a delegate user ID. The model structure generated by the model structure generation unit (330) is stored in the model structure storage unit (335). The model structure recorded in the model structure storage unit (335) is transmitted through the server communication unit (325) to the agent server (110) to be used for generating a segmented task structure.

When the recording of terminal operations has been initiated by a primary user, the input operation acquisition unit (340) acquires all the terminal operations performed in the web browser (315) by the primary user. The input operation storage unit (345) records the user's terminal operations which are acquired by the input operation acquisition unit (340). In one embodiment, the user's terminal operations which are recorded in the input operation storage unit (345) are transmitted to the agent server (110), and may then be used by the agent server (110) for reproduction of any operations performed by the client (120).

In response to the event that a delegate user receives a processing request for a delegate input task from the agent server (110) and the delegate user then accepts the request, the reproduction processing unit (350) transmits a request for an input reproduction file to the agent server (110) via the server communication unit (325). The input reproduction file storage unit (355) stores the input reproduction file. The input reproduction file is received by the server communication unit (325) as a reply to the request for the input reproduction file. The input reproduction file provides a data input interface for the input field assigned to the delegate user. Further, the reproduction processing unit (350) executes on the web browser (315) the input reproduction file stored in the input reproduction file storage unit (355).

The delegate input value acquisition unit (360) acquires a delegate input value entered by the delegate user into the assigned input field included in the input screen displayed on the display unit (310). The delegate input value storage unit (365) temporarily stores the delegate input value acquired by the delegate input value acquisition unit (360). The delegate input value which is stored in the delegate input value storage unit (365) is transmitted to the agent server (110) via the server communication unit (325).

The browser interface control unit (370) controls the web browser (315) interface. For example, in response to the event that a delegate input mode is selected in the client (120), the browser interface control unit (370) generates an input screen including an interface for designating a delegate user from the input screen received from the application server (170), and displays the generated screen on the display unit (310).

Figure 4:
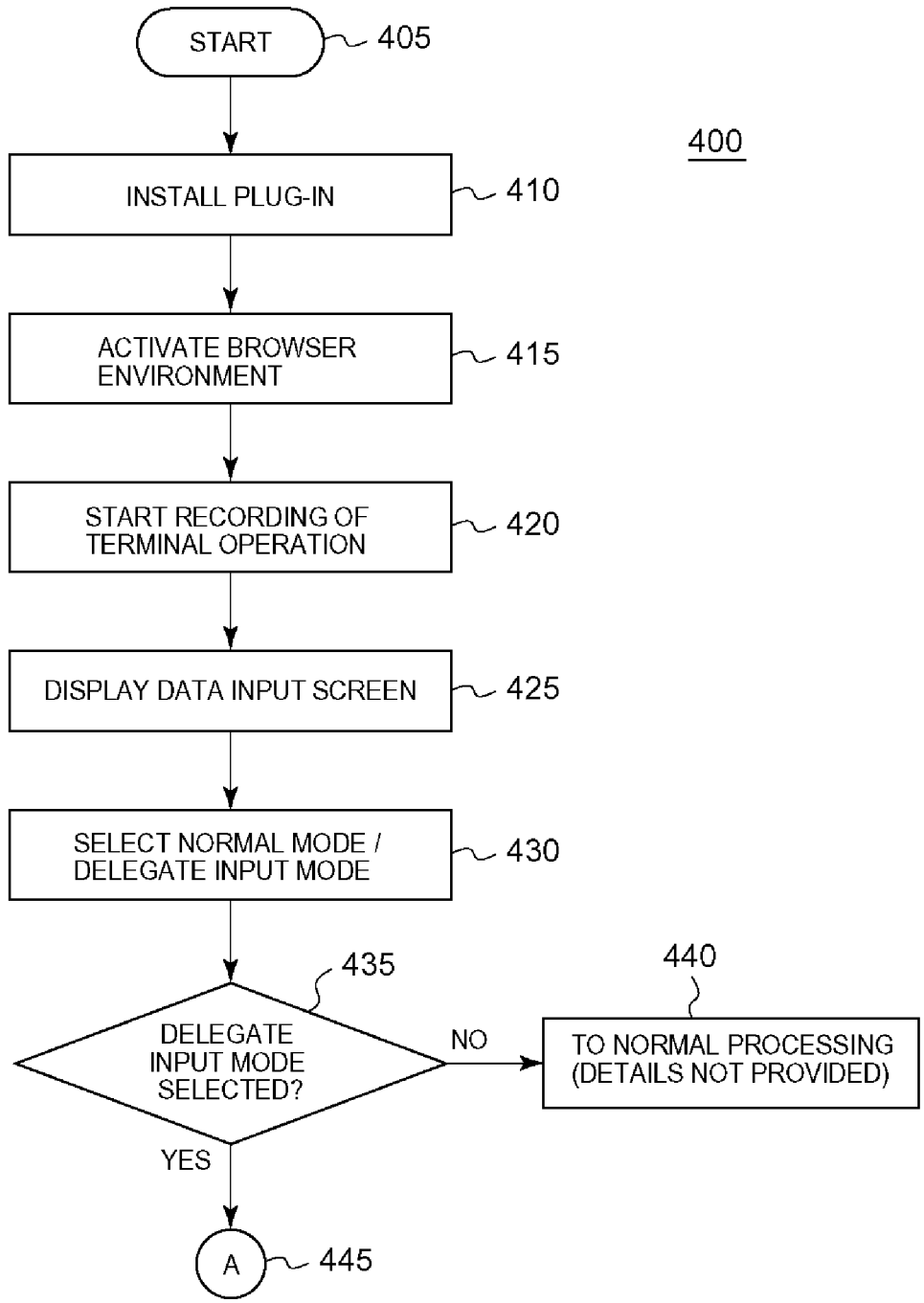
FIG. 4 is a flowchart illustrating an operation of an input terminal in a data processing system, according to one embodiment of the present invention.

FIG. 4 is a flowchart (400) illustrating an input terminal (120a operation in the data processing system (100) of one embodiment of the present technique. The process starts at step 405. In step 410, the plug-in program stored in the agent server's (110) plug-in management unit (215) is downloaded and installed onto a client (120) in response to a request from that client (120). The plug-in is installed on both the input terminal (120a) and the delegate terminal (120b). Installation of the plug-in is required only once for each client (120), and is not required every time any business processing is conducted by the application server (170).

The process proceeds to step 415, wherein the browser environment of the input terminal (120a) is activated when the primary user double-clicks on an icon representing the web browser. The icon may be provided on a desktop screen of an input terminal's (120a) display device.

Next, in step 420, recording of the input operations performed by a primary user into an input terminal's (120) web browser is initiated in response to a prescribed operation by the primary user. For example, the primary user could press a button entitled "operation recording start button" which may be added to the web browser by the browser interface control unit (370) of the plug-in (320). After the prescribed operation, any input operations performed by the primary user on the input terminal's (120a) web browser are all recorded. Next, in step 425, the primary user instructs the input terminal (120a) to request the reimbursement processing of the application server (170), and then displays an input screen received as the reply on the display device. In one embodiment, the input screen thus provided to the primary user includes one or more input fields for entering data items necessary for conducting the reimbursement processing.

As the process proceeds to step 430, the primary user instructs the input terminal (120a) to switch from a normal mode to a delegate input mode. The normal mode is a mode in which the primary user performs data input necessary for the reimbursement processing by the application server (170) for all the input items. The delegate input mode is a mode in which the data input necessary for the reimbursement processing is delegated to another employee or person for at least one input item.

In step 435, if the normal mode has been selected, the process proceeds along the NO arrow to step 440, in which conventionally existing, normal reimbursement processing is carried out based on the interaction between the application server (170) and the input terminal (120a). Such normal business processing is known to and appropriately done by those skilled in the art. Therefore, a detailed description thereof will not be provided here.

Figure 5:
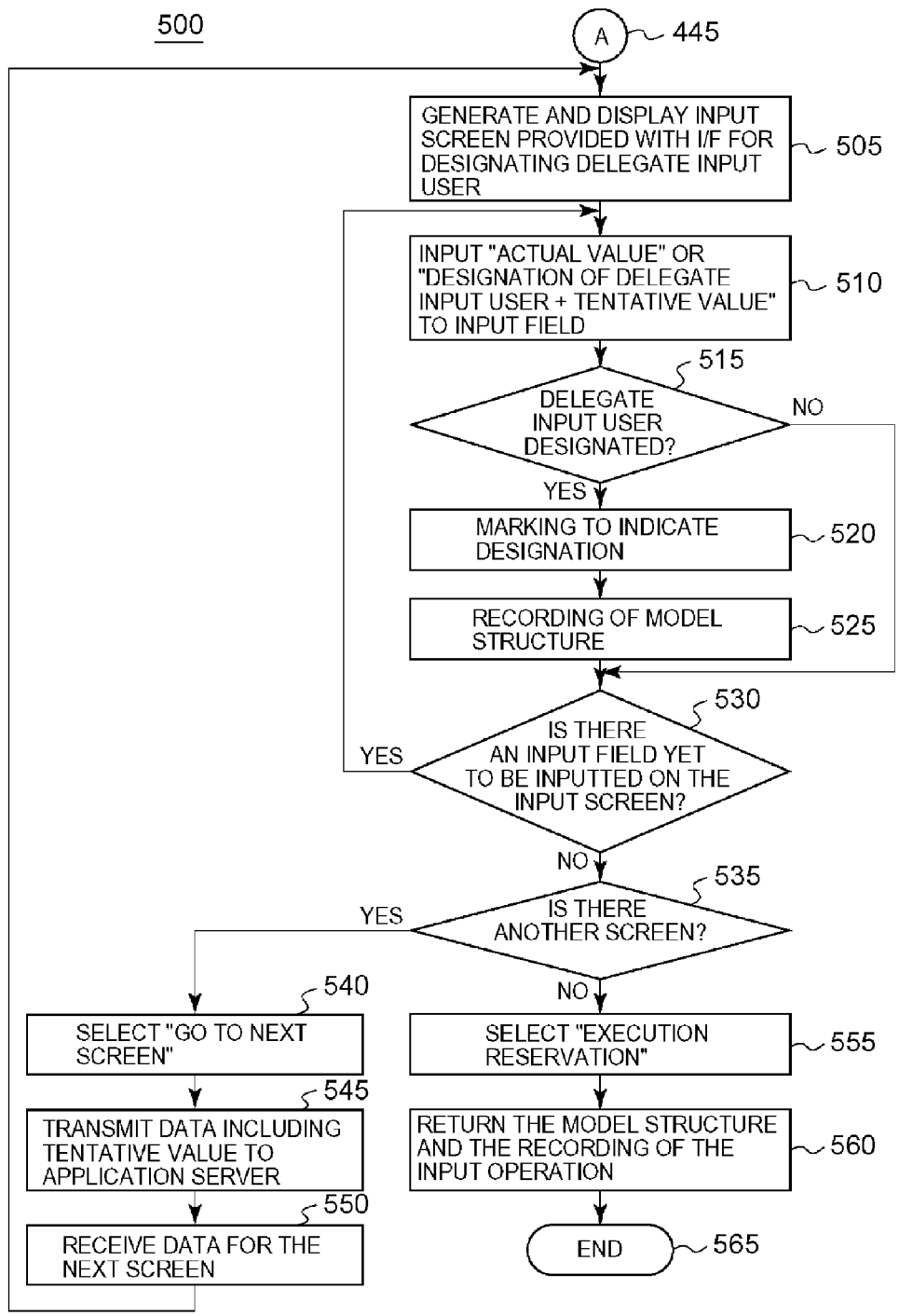
FIG. 5 is a flowchart illustrating an operation of the input terminal in a data processing system, according to one embodiment of the present invention.

If it is determined in step 435 that the delegate input mode has been selected, the process proceeds along the YES arrow to the symbol (A) corresponding to step 445, and further to step 505 in a flowchart 500 in FIG. 5.

FIG. 5 is a flowchart (500) illustrating the operation of the input terminal (120a) in a data processing system (100). In step 505, if the delegate input mode has been selected, the browser interface control unit (370) of the plug-in (320) installed on the input terminal (120a) generates an input screen containing an interface for designating a delegate user. The input screen is based on an input screen received from the application server (170). The generated input screen is then displayed on the input terminal (120a).

Next, in step 510, the primary user uses the input terminal (120a) to enter either an "actual value" or a "designation of delegate user" onto one of the input fields included in the input screen displayed in step 505. The actual value may conform to the specification of the data required for the business processing in terms of format and believed by the primary user to be accurate. If the primary user enters the "designation of delegate user", the primary user enters a "tentative value." The tentative value may be inaccurate although it conforms to the specification of the data required for the business processing.

More specifically, in step 510, the browser interface control unit (370) of the input terminal (120a) communicates with the user management server (150) to display a selection list of available delegate users, and receives the primary user's selection of a delegate user from the selection list.

FIG. 13 is an example of a window interface including the selection list for designating a delegate user, according to one embodiment of the present technique. In the window (1300) of FIG. 13, a selection list (1320) for selection of a delegate user is displayed for an input field (1310) to which a billed department code is to be entered.

Referring again to FIG. 5, the process proceeds to step 515, wherein it is to be determined whether or not the delegate user has been designated for the input field in step

510. If it is determined in step 515 that the delegate user has been designated, the process proceeds along the YES arrow to step 520, in which a form of marking indicates which delegate user assigned to the input field has been chosen. If a delegate user has not been designated, the process proceeds to step 530 along the NO arrow.

FIG. 14 shows an example of an input screen where the marking of the designated delegate user has been carried out, according to one embodiment of the present technique. In FIG. 14, the marking (1410) is added for the designated input field by the browser interface control unit (370) of the input terminal (120a).

The process further proceeds to step 525, in which the input terminal (120a) records a model structure (1000) for the delegate user which has been designated by the primary user in step 510. The model structure (1000) includes an input field for which the delegate user is designated and the input screen including the input field.

Figure 10:
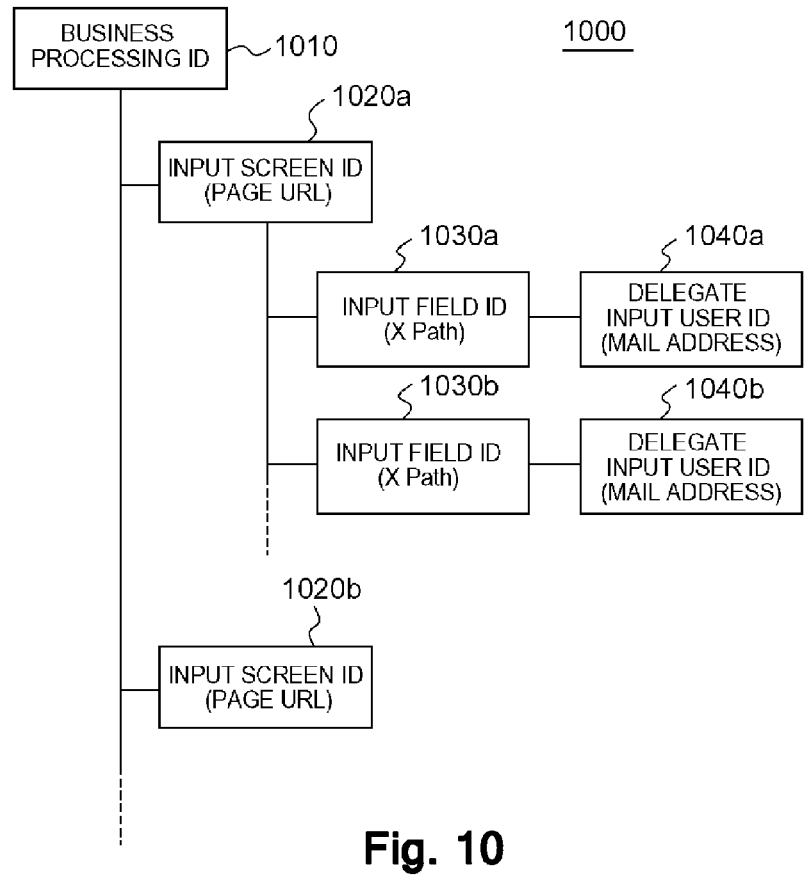
FIG. 10 illustrates a model structure recorded on an input terminal in a data processing system, according to one embodiment of the present invention.

FIG. 10 illustrates a model structure (1000) which has been recorded by the input terminal of a data processing system, according to one embodiment of the present technique. The model structure (1000) has a hierarchical data structure (specifically, tree structure) which includes a business processing ID (1010), input screen IDs (1020a) through (1020n), input field IDs (1030a) through (1030n), and delegate user IDs (1040a) through (1040n). Herein, the input screen IDs (1020a) through (1020n), the input field IDs (1030a) through (1030n), and the delegate user IDs (1040a) through (1040n) will be collectively referred to as "input screen ID (1020)", "input field ID (1030)", and "delegate user ID (1040)", respectively.

At its root, the tree structure of the model structure (1000) has the business processing ID (1010) for specifying the business processing requested by the primary user from the application server (170). The business processing IDs (1010) are allocated in advance to the respective business processing. In one embodiment, the business processing ID (1010) allocated to the current reimbursement processing is recorded.

On one hierarchical level beneath that of the business processing ID, the model structure (1000) has at least one input screen ID (1020) for specifying the input screen for entering data necessary for performing the business processing specified by the business processing ID (1010). In one embodiment, only the input screen ID (1020) of an input screen containing the input field for which a delegate user has been designated is included in the model structure. In one embodiment, the input screen ID (1020) for specifying the input screen is a Uniform Resource Locator (URL) to the corresponding input screen.

On one hierarchical level beneath that of the input screen ID (1020), the model structure (1000) has an input field ID (1030). The input field ID (1030) is included in the input screen specified by the input screen ID (1020). In one embodiment, only the input field ID (1030) of the input field for which a delegate user has been designated is included in the model structure. The input field ID (1030) is an XPath (XML Path Language) of the corresponding input field.

On one hierarchical level beneath that of the input field ID (1030), the model structure (1000) has a delegate user ID (1040) for specifying the designated delegate user. In one embodiment, the input field ID (1030) and the delegate user ID (1040) are associated with each other. In one embodiment, the delegate user ID (1040) is a mail address of the corresponding designated delegate user.

Returning to the flowchart (500) in FIG. 5, after the model structure is recorded in step 525, the process proceeds to step 530. As mentioned above, when it has been determined in step 515 that a delegate user has not been designated, i.e., an actual value has been entered, the process proceeds to step 530 along the NO arrow.

In step 530, it is determined whether or not there is any input field yet to be completed in the input screen currently displayed. If it is determined in step 530 that there is an input field yet to be completed, the process returns to step 510 along the YES arrow, and steps 510 through 525 are repeated for any input field yet to be completed until there are no more input fields yet to be completed. During the repetition of steps 510 through 525, recording of the model structure is added as appropriate for the input field to which a delegate user is designated.

If it is determined in step 530 that there are no more input fields yet to be completed, the process proceeds along the NO arrow to step 535. At step 535, it is determined whether or not there are any remaining screens containing input fields yet to be completed for performing the reimbursement processing.

The use of a plurality of input screens for entering data required for the reimbursement processing in the above-described manner may have the benefit of implementing a more user-friendly interface. For example, multiple input screens could allow the user to input traveling expenses on a first input screen, food and drink expenses on a second input screen, and lodging expenses on a third input screen. Using a plurality of input screens is a frequently adopted way of designing an application program.

The primary user may instruct the input terminal (120a) to select either "GO TO NEXT SCREEN" or "EXECUTION RESERVATION" in accordance with the determination made in step 535. FIG. 15 shows an example of the interface for selecting either "GO TO NEXT SCREEN" or "EXECUTION RESERVATION," according to one embodiment of the present technique. In the interface shown in FIG. 15, the primary user selects "GO TO NEXT SCREEN" or "EXECUTION RESERVATION" from the selection list (1510) displayed by the browser interface control unit (370) of the input terminal (120a).

If it is determined in step 535 that there is at least one remaining input screen, the process proceeds along the YES arrow to step 540, where "GO TO NEXT SCREEN" is selected. Next, in step 545, in response to selection of "GO TO NEXT SCREEN", the input data including a tentative value entered in step 510, if any, is transmitted to the application server (170), and data for a next screen is requested.

The process then proceeds to step 550, where the input terminal (120a) receives from the application server (170) the data for the next input screen requested in step 545. Thereafter, the process returns to step 505, and the steps 505 through 550 are repeated for the input screen according to the data received in step 550, until there are no more screens for entering data necessary for performing the reimbursement processing.

If it is determined in step 535 that there are no more input screens, the process proceeds along the NO arrow to step 555, where "EXECUTION RESERVATION" is selected. Next, the process proceeds to step 560, where the input terminal (120a) transmits the model structure (1000) including the information for designating a delegate user to the agent server (110). In step 560, the input terminal (120a) also transmits to the agent server (110) a part of the recording of terminal operations performed by the primary user. The recording was initiated in the above-described step 420, that concerns the current business processing (i.e., the reimbursement processing). Next, the process proceeds to step 565, wherein the process is terminated.

Figure 6:
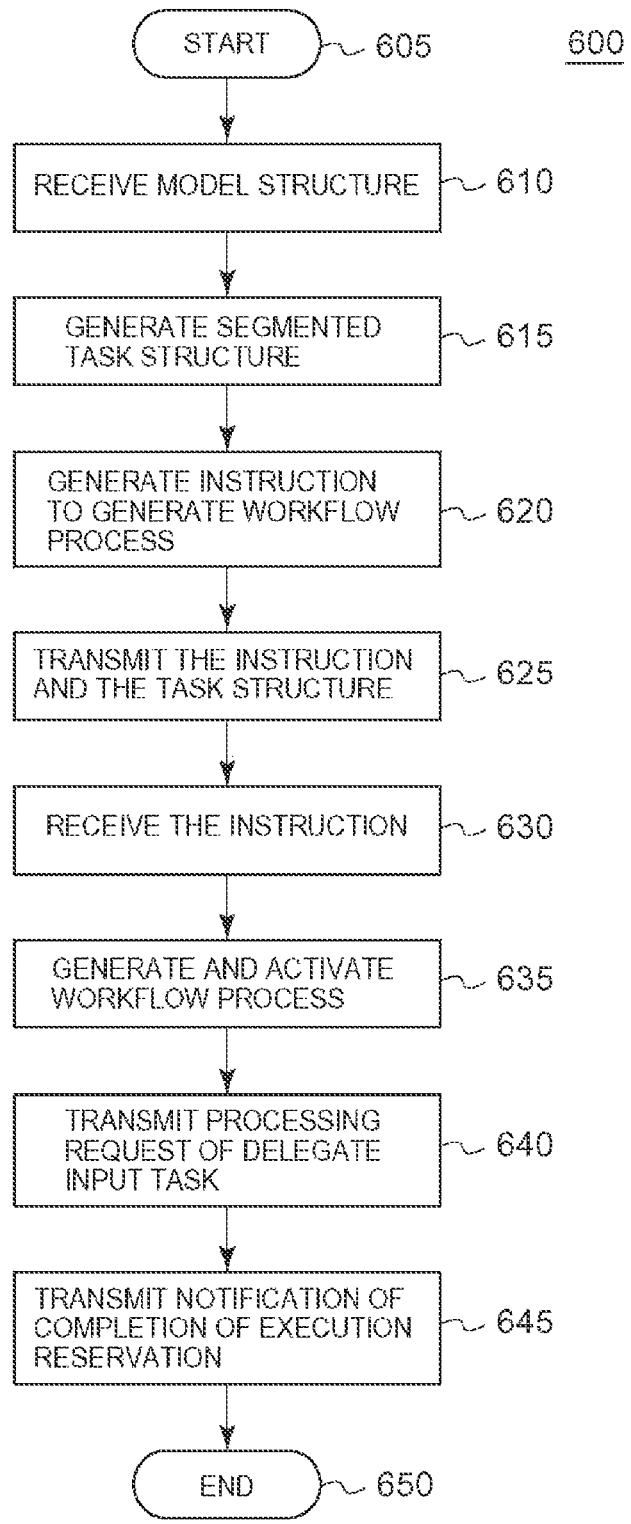
FIG. 6 is a flowchart illustrating an operation for the preparation of delegate input task processing, according to one embodiment of the present invention.

FIG. 6 is a flowchart (600) illustrating an operation for preparing a delegate input task for processing, including the generation of a workflow process, according to one embodiment of the present technique. The process starts at step 605. In step 610, the agent server (110) receives the model structure (1000) transmitted by the input terminal (120a) in the above-described step 560. Next, in step 615, the agent server (110) interprets the received model structure (1000) to generate a segmented task structure (1100).

Figure 11:
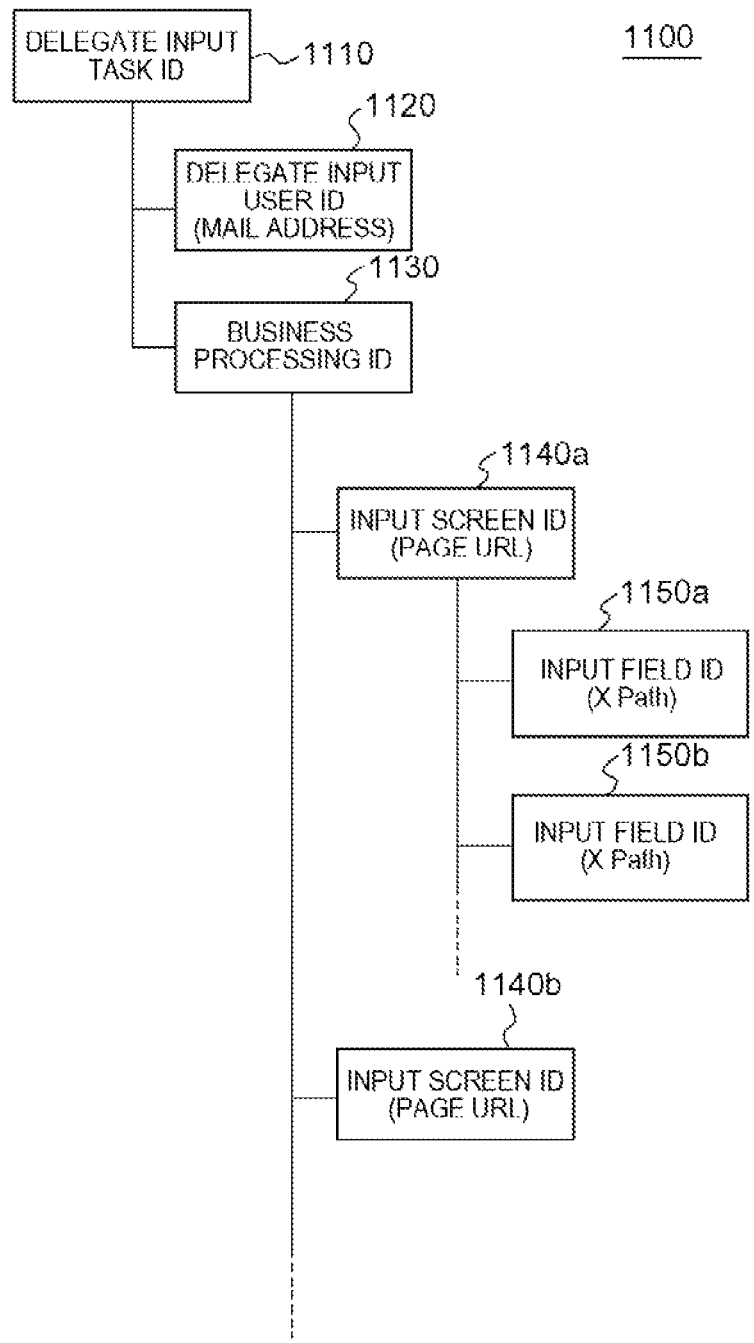
FIG. 11 illustrates a segmented task structure in a data processing system, according to one embodiment of the present invention.

FIG. 11 illustrates a segmented task structure (1100) generated by the agent server (110) in the data processing system, according to one embodiment of the present technique. The segmented task structure (1100) has a hierarchical data structure (specifically, tree structure) which includes a delegate input task ID (1110), a delegate user ID (1120), a business processing ID (1130), input screen IDs (1140a) through (1140n), and input field IDs (1150a) through (1150n). Herein, the input screen IDs (1140a) through (1140n) and the input field IDs (1150a) through (1150n) will be collectively referred to as "input screen ID (1140)" and "input field ID (1150)", respectively.

As its root, the tree structure of the segmented task structure 1100 has a delegate input task ID (1110) for specifying the delegate input task assigned to a respective delegate user. In one embodiment, the delegate input task IDs (1110) are generated by a number corresponding to the number of the delegate user IDs existing in the model structure (1000) received by the agent server (110). The generated delegate input task IDs (1110) are each recorded as a root of the segmented task structure (1100).

On one hierarchical level beneath that of the delegate input task ID (1110), the segmented task structure 1100 has a delegate user ID (1120) for specifying the delegate user who is responsible for performing the task, and a business processing ID (1130) generated from the business processing ID (1010) of the model structure (1000).

The segmented task structure (1100) has an input screen ID (1140) on one hierarchical level beneath that of the business processing ID (1130), and an input field ID (1150) on one hierarchical level beneath that of the input screen ID (1140). Both the input screen ID (1140) and the input field ID (1150) of the segmented task structure (1100) are generated from the input screen ID (1020) and the input field ID (1030), respectively, of the model structure (1000). Only those related to the delegate user ID (1120) included in the segmented task structure (1100) are extracted and recorded.

Returning to the flowchart (600) in FIG. 6, in step 620, the agent server (110) generates an instruction to dynamically generate a workflow process (1200). The workflow process (1200) includes at least one delegate input task which indicates that a delegate user has been asked to enter data into an assigned input field enters data into the input field.

The process proceeds to step 625, where the agent server (110) transmits to the workflow server (160) an instruction to dynamically generate the workflow process (1200) generated in step 620, and the segmented task structure (1100) generated in step 615.

In step 630, the workflow server (160) receives the instruction to dynamically generate the workflow process (1200) and the segmented task structure (1100). In response, the workflow server (160), generates the workflow process (1200) based on the segmented task structure (1100) in step 635. In one embodiment of the present invention, the generated workflow process (1200) is activated as well in step 635.

Figure 12:
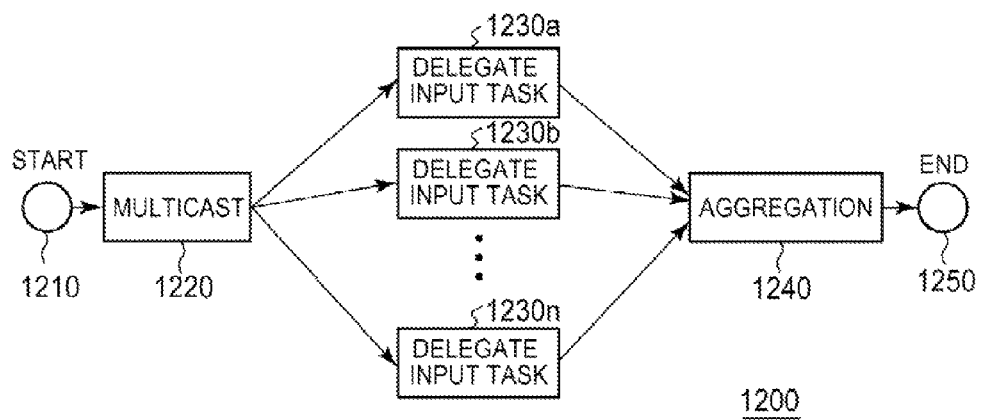
FIG. 12 illustrates a workflow process in a data processing system, according to one embodiment of the present invention.

FIG. 12 illustrates a workflow process (1200) generated by the workflow server (160) in a data processing system, according to one embodiment of the present technique. The workflow process (1200) includes a start process step (1210), a multicast process step (1220), one or more delegate input tasks (1230a) through (1230n) (hereinafter, collectively referred to as "delegate input task (1230)") processed in parallel, an aggregation process step (1240), and an end process step (1250).

The in-house network system (100) operates according to the workflow process (1200) in the following manner. When the workflow process (1200) is activated, the workflow process starts at the start process step (1210). In the multicast process step (1220), for each delegate input task (1230), a processing request for a delegate input task is transmitted to the delegate terminal of the assigned delegate user. Thereafter, the delegate input task is carried out in the delegate terminal, and the input data entered by the delegate user is transmitted to the agent server (110).

Next, if every delegate input task (1230) has been completed, or more specifically, if notification of completion has been received for all of the delegate input tasks from the agent server (110) that received the input data, the process proceeds to the aggregation process step (1240). In the aggregation process step (1240), an instruction to start the delegate processing is transmitted to the agent server (110). The process then proceeds to the end process step (1250), wherein the workflow process is terminated.

Returning to the flowchart (600) in FIG. 6, in step 640, the agent server (110) uses the collaboration server (140) to transmit a processing request for a delegate input task of entering data into a corresponding input field, to the delegate terminal of a designated delegate user.

The process further proceeds to step 645, wherein the agent server (110) transmits notification of completion of execution reservation to the input terminal (120a). The notification then notifies the primary user of the completion of the execution reservation. Thereafter, the process proceeds to step 650, wherein the process is terminated.

Figure 7:
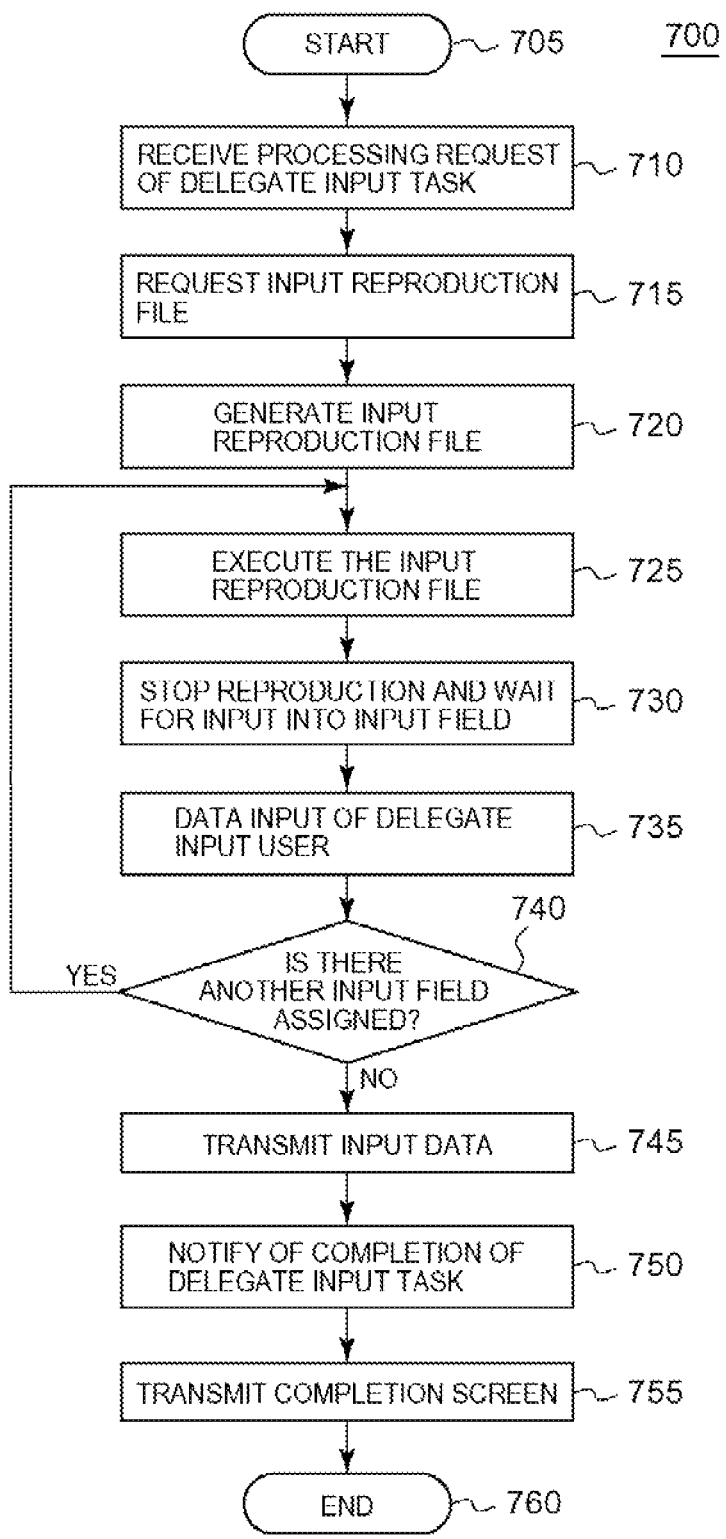
FIG. 7 is a flowchart illustrating an operation of the delegate input task processing, according to one embodiment of the present invention.

FIG. 7 is a flowchart (700) illustrating an operation of the delegate input task processing, according to one embodiment of the present technique. The process starts at step 705. In step 710, the delegate terminal (120b) receives the processing request for the delegate input task transmitted from the agent server (110) in the above-described step 640.

In response to reception of the processing request for a delegate input task, the delegate terminal (120b) starts the processing of the delegate input task (1230) included in the assigned workflow process (1200). This is done in order to receive a data input from the designated delegate user to the corresponding input field. Specifically, the delegate user performs the processing of the delegate input task through the following steps.

First, in step 715, an input reproduction file is requested from the agent server (110). The input reproduction file causes a primary user operation performed at the input terminal (120a) to be reproduced at the delegate terminal (120b) in a pseudo manner.

Next, in step 720, the delegate user-based reproduction processing unit (245) of the agent server (110) generates the input reproduction file requested by the delegate terminal (120b) in step 715. The request is based on both the segmented task structure stored in the segmented task structure storage unit (230) and the recording of input operations stored in the input operation storage unit (240). The generated input reproduction file includes the operation(s) made by the primary user at the input terminal (120a), the input field(s) assigned to the delegate user who requested the relevant input reproduction file, and information of a stop point of the reproduction processing necessary to allow the delegate user to enter data into the assigned input field(s).

Further, in step 725, the delegate terminal (120*b*) uses the above-described input reproduction file to reproduce the operation(s) of the primary user at the input terminal (120*a*) in a pseudo manner. In one embodiment, the reproduction processing carries out interaction with the application server (170) via the agent server (110). The reproduction processing is also carried out on the background (i.e., carried out only inside the computer so as to prevent visual recognition of the delegate user).

Figure 16:
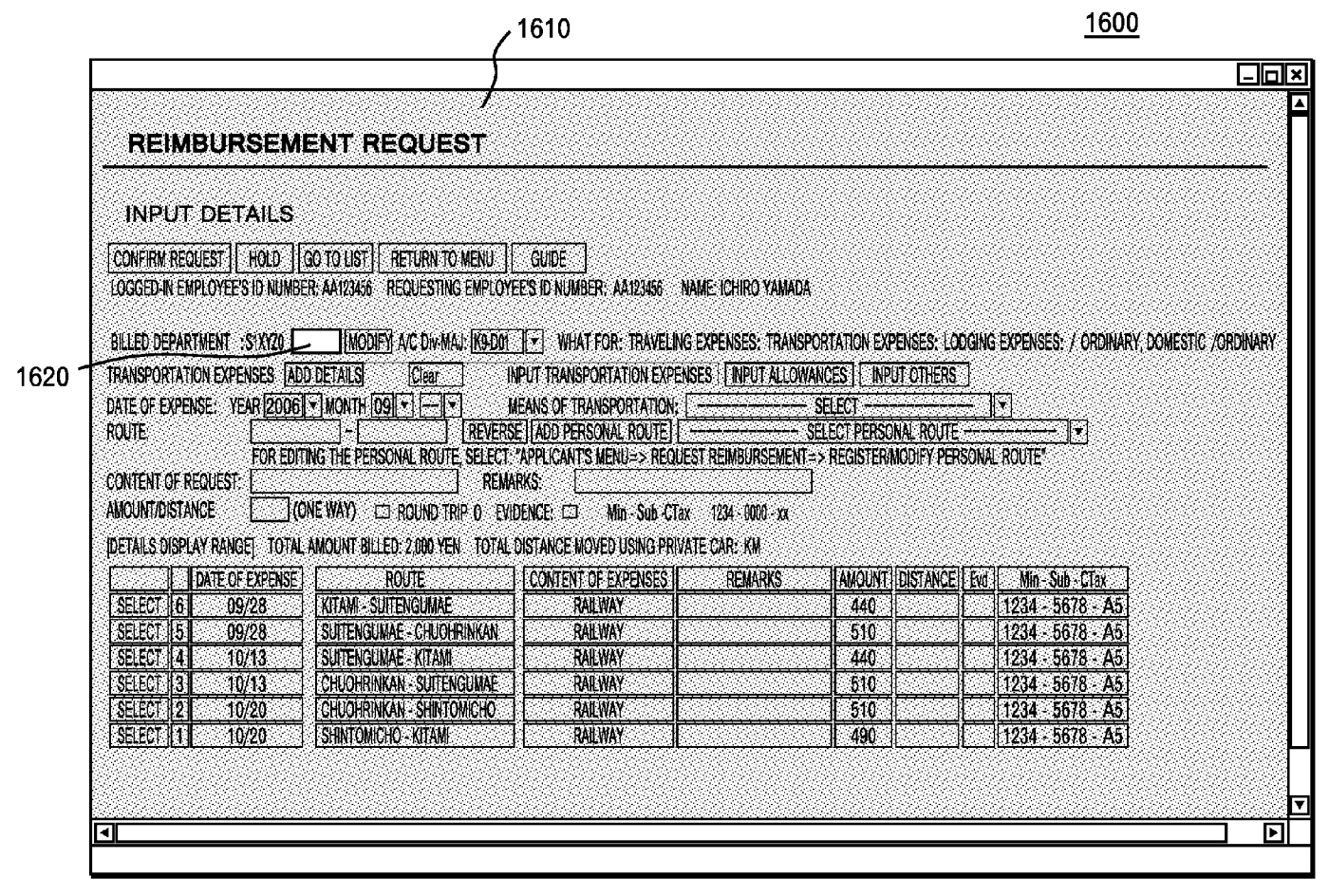

The process then proceeds to step 730, wherein the plug-in, installed on the web browser of the delegate terminal (120*b*), displays an input screen which accepts input to only the input field(s) which have been designated to the delegate user. The plug-in then prompts a data entry from the delegate user into the designated input field(s). FIG. 16 shows an example of the input screen on which only the input field to be completed by the delegate user is made to accept the input. In the input screen (1600) in FIG. 16, a portion (1610) other than the input field (1620) to which the delegate user is supposed to enter data is changed to a darker color and made to prohibit data entry thereto by the browser interface control unit (370) of the input terminal (120*a*).

The process proceeds to step 735, wherein the delegate user enters data into any delegated input field on the input screen accepting input. Only the input field(s) to be entered by the delegate user are made to accept any input.

Next, in step 740, it is determined whether or not there are any remaining input fields assigned to the delegate user. If it is determined that there are any remaining input fields assigned to the delegate user, the process returns to step 725 along the YES arrow, wherein steps 725 through 735 are repeated for any remaining input fields.

If it is determined in step 740 that there are no more input fields assigned to the delegate user, the process proceeds along the NO arrow to step 745. In step 745, the delegate terminal (120*b*) transmits to the agent server (110) the input data entered by a delegate user through steps 725-735.

Next, in step 750, in response to reception of the input data transmitted from the delegate terminal (120*b*) in step 745, the agent server (110) transmits to the workflow server (160), notification that the corresponding delegate input task has been completed. In step 755, the agent server (110) generates a delegate input task completion screen, and then transmits the same to the delegate terminal (120*b*). Thereafter, the process proceeds to step 760, wherein the process is terminated.

Figure 8:
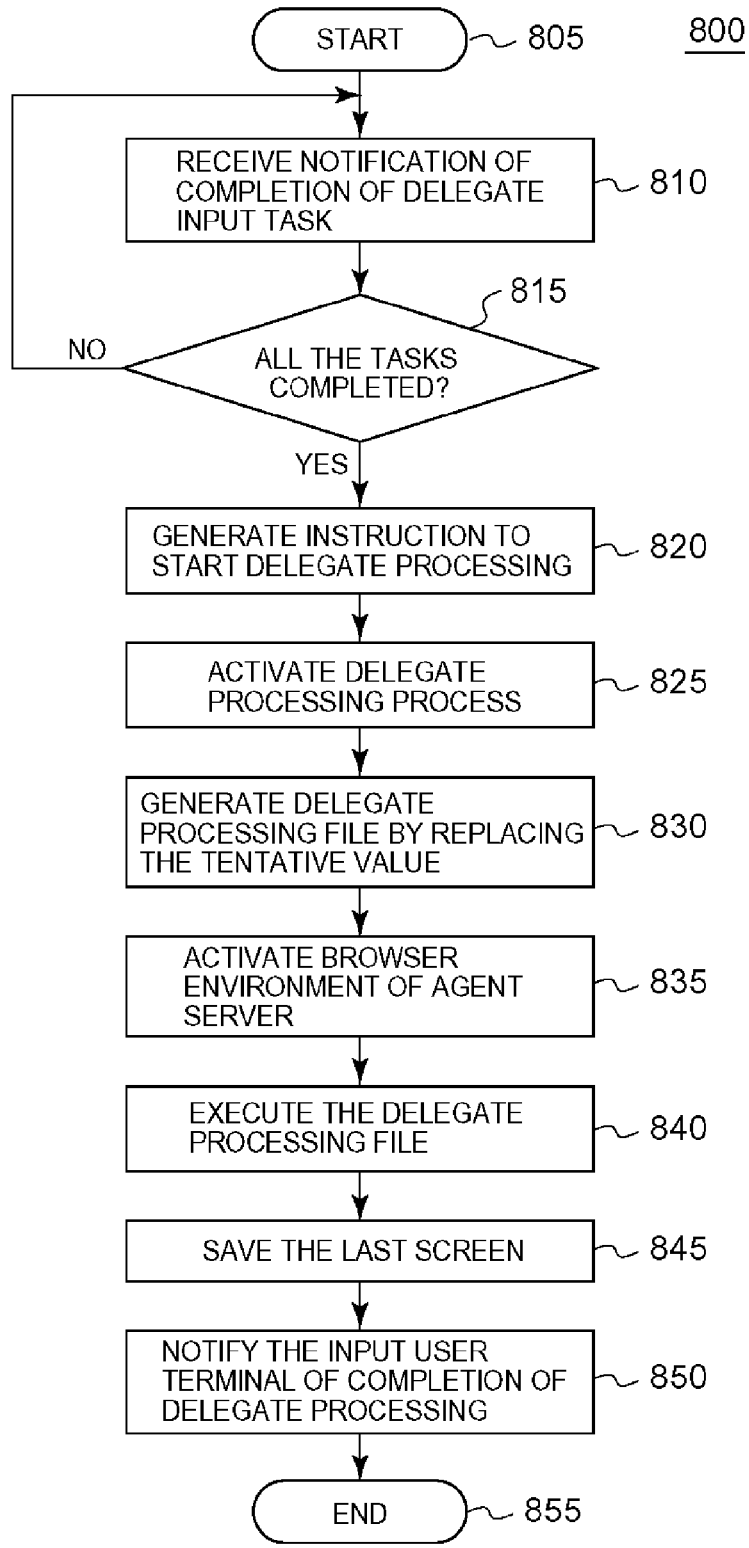
FIG. 8 is a flowchart illustrating an operation of delegate processing, according to one embodiment of the present invention.

FIG. 8 is a flowchart (800) illustrating an operation of delegate processing, according to one embodiment of the present technique. The process starts at step 805. In step 810, the workflow server (160) receives the notification transmitted from the agent server (110) that the delegate input task has been completed.

The process proceeds to step 815, in which the workflow server (160) determines whether or not all delegate input tasks (1230) have been completed. If there are any remaining tasks, the process returns to step 810 along the NO arrow. If it is determined in step 815 that all of the tasks have been completed (specifically, if notification of completion has been received from the agent server (110) for all the delegate input tasks), the process then proceeds to step 820. In step 820, the workflow server (160) generates an instruction to start the delegate processing, and transmits the same to the agent server (110).

Next, in response to reception of the instruction to start the delegate processing, the agent server (110) uses the data entered by the delegate user to perform the delegate processing for the business processing in the application server. More specifically, the agent server (110) performs the delegate processing through the following steps.

First, in step 825, in response to reception of the instruction to start the delegate processing, the agent server (110) starts the delegate processing process. Subsequently, in step 830, the agent server (110) replaces any tentative value(s) in the recording of input operations with the actual value(s) entered by the delegate user. The agent server (110) may then create a delegate processing file that records procedure for conducting the delegate processing in the browser environment. Next, in step 835, the agent server (110) activates the browser environment for executing the delegate processing file.

In step 840, the agent server (110) executes the delegate processing file in the browser environment to carry out the delegate processing through the interaction with the application server (170). Subsequently, in step 845, the agent server (110) saves the last screen received from the application server (170) in the delegate processing.

The process then proceeds to step 850, in which the agent server (110) transmits to the input terminal (120*a*), notification that the delegate processing is completed. The notification transmitted in step 850 that the delegate processing is completed includes a link to the last screen of the delegate processing saved in step 845. This allows the primary user to access the last screen and confirm further information about the completion of the business processing. The process then proceeds to step 855, wherein the process is terminated.

Figure 9:
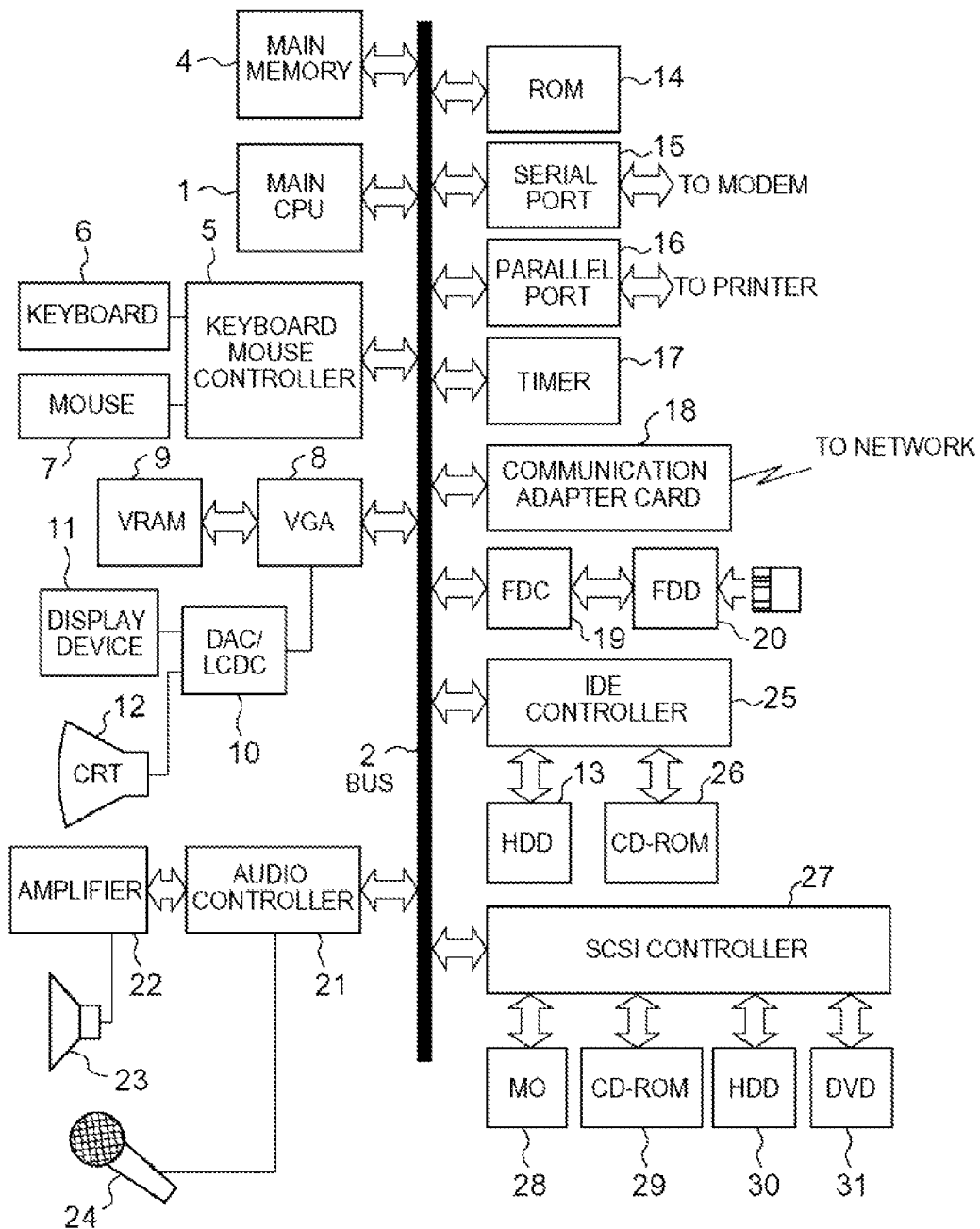
FIG. 9 shows an example of a hardware configuration of an information processing apparatus suitable for implementing the client and the servers, according to one embodiment of the present invention.

FIG. 9 shows an example of a hardware configuration of an information processing apparatus suitable for implementing the client and the servers, according to one embodiment of the present technique. The information processing apparatus includes a Central Processing Unit (CPU) (1) and a main memory (4) connected to a bus (2). Further, hard disk drives (13, 30), and removable storages (external storage systems for which recording media can be exchanged) such as Compact Disc-Read Only Memory (CD-ROM) drives (26), (29), flexible disk drives (20), Magneto-Optical (MO) drives (28), and Digital Video Disc (DVD) drives (31), are connected to the bus (2) via a flexible disk controller (19), an Integrated Drive Electronics (IDE) controller (25), an Small Computer System Interface (SCSI) controller 27 and others.

The recording media such as flexible disks, MOs, CD-ROMs, and DVD-ROMs are inserted into the removable storages. These recording media, the hard disk drives (13, 30) and a ROM (14) are capable of recording computer program codes for implementing the present invention by providing instructions to the CPU and others by cooperating with an operating system. The computer program is executed as it is loaded to the maim memory (4). The computer program may be compressed, or divided into a plurality of pieces, to be recorded on a plurality of media.

The information processing apparatus receives an input from input devices such as a keyboard (6) and a mouse (7) via a keyboard/mouse controller (5). The information processing apparatus is connected via a (Digital Analog Converter/Liquid Crystal Display Classification (DAC/LCDC) (10) to a display device (11) for providing visual data to a user.

The information processing apparatus can connect to a network via a network adapter (18) (Ethernet® card or token ring card) to communicate with other computers. The information processing apparatus can also connect to a printer via a parallel port, or to a modem via a serial port.

It will readily be appreciated from the above description that the information processing apparatus suitable for implementing the system according to an embodiment of the present invention can be implemented by an ordinary information processing apparatus such as personal computer, workstation, mainframe and the like, or by a combination thereof. However, these elements are only illustrative, and all the elements are not necessarily indispensable to the present invention.

It is of course readily possible for those skilled in the art to conceive various modifications such as combining a plurality of machines and distributing to the machines the functions of the hardware elements of the information processing apparatus used in the embodiment of the present invention. Such modifications are naturally concepts embodied in the idea of the present invention.

The client and servers according to the embodiment of the present invention may each adopt an operating system supporting the Graphical User Interface (GUI) multi-window environment, such as the Windows® operating system available from Microsoft Corporation, the MacOS® available from Apple Computer Incorporated, or the UNIX® based system provided with the X Window System (for example, AIX® available from International Business Machines Corporation).

It can be understood from the foregoing that the system used in an embodiment of the present invention is not restricted to a specific operating system environment. That is, any operating system may be adopted as long as it can provide a resource management function to allow the application software to use the resources of the data processing system. While the resource management function may include a hardware resource management function, file handling function, spool function, job management function, memory protective function, virtual memory management function and others, these functions are well known to those skilled in the art, and thus, detailed description thereof will not be provided here.

Further, the present invention can be implemented as hardware, software, or a combination of such. A typical example of implementing the present invention by a combination of the hardware and software is implementation with a data processing system having a prescribed program. In this case, as the prescribed program is loaded to and executed by the data processing system, the program controls the data processing system to let it execute the processing according to the present invention. The program is composed of an instruction set that can be expressed by an arbitrary language, code, or notation. The instruction set allows the system to perform a particular function, directly or after either or both of the following: 1) conversion to another language, code, or notation; and 2) reproduction in another medium.

It is needless to say that not only such a program itself but also the medium having the program recorded thereon is within the scope of the present invention. The program for execution of the functions of the present invention can be stored in any computer readable recording medium such as a flexible disk, MO, CD-ROM, DVD, hard disk drive, ROM, Magnetoresistive Random Access Memory (MRAM), and Random Access Memory (RAM). In order for storage to the recording medium, the program may be downloaded from another data processing system connected via a communication line or may be duplicated from another recording medium. Further, the program may be stored in one recording medium or a plurality of recording media by compressing or dividing it into a plurality of pieces. Furthermore, it is of course possible to provide a program product for implementing the present invention in various forms.

It will be apparent for those skilled in the art that various modifications or improvements are possible for the embodiment described above. For example, although the collaboration server, the user management server, and the workflow server are prepared separately from the agent server in the embodiment of the present invention, it is possible to implement the servers with logically divided partitions existing on one and same package hardware. Alternatively, part or all of the functions provided by the servers that are necessary for accomplishing the present invention may be implemented as a software component introduced into the agent server.

In one embodiment of the present invention, the selection list is used for the primary user to select a delegate user by communicating with the user management server. Alternatively, it may be configured such that, on the condition that a delegate user matching a specific notation method defined in advance for an input field is designated, the plug-in detects and interprets the same to specify the designation of a delegate user.

While the normal mode or the delegate input mode is explicitly selected by the primary user in the embodiment of the present invention, it may also be configured such that it is determined that the delegate input mode has been selected on the condition that the plug-in detects matching with the above-described specific notation method. In this case, it is preferable that the plug-in redirects the data transmission to the application server and the like to the agent server as required. Further, while the reproduction processing is carried out on the background in one embodiment of the present invention, it may be carried out on the foreground in order to provide the delegate user with more information necessary for the delegate input operation.

In one embodiment of the present invention, the reproduction processing at the delegate user terminal is performed through interaction with the application server. Alternatively, it may be configured such that the input terminal records input screen data in the HTML/XML format and transmits the same to the agent server, and the agent server uses the received input screen data to provide a delegate user with the interface for processing the delegate input task, without the need to interact with the application server.

While it is configured in one embodiment of the present invention such that the primary user enters a tentative value together with the designation of a delegate user, it may also be configured such that the plug-in automatically allocates the tentative value based on the attribute of the input field and/or the input history in the past.

While the delegate processing file is executed in the browser environment of the agent server in one embodiment of the present invention, it may also be configured such that the agent server remotely controls the input terminal and others so that the delegate processing is performed in the browser environment of the input terminal.

It should be noted that the modified or improved embodiments described above are naturally within the technical scope of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for supporting input of data necessary for performing business processing in a data processing system including an input user terminal and a delegate input user terminal, the method comprising the steps of:
   the input user terminal starting recording of a terminal operation of an input user;
   the input user terminal displaying an input screen of data necessary for the business processing, the input screen including one or more input fields and an interface for designating a delegate input user for at least one of the one or more input fields;
   the input user terminal receiving from the input user a designation of the delegate input user for at least one of the one or more input fields;
   the delegate input user terminal starting reproduction processing of an operation at the input user terminal by using an input reproduction file created based on the recording of the terminal operation of the input user;
   the delegate input user terminal stopping the reproduction processing and prompting the delegate input user to input data to be inputted to the input field assigned to the delegate input user;
   the delegate input user terminal receiving the input of the data from the delegate input user to the input field for which the delegate input user is designated; and
   the delegate input user terminal transmitting the inputted data from the delegate input user.

2. The method according to claim 1, wherein the prompting step includes the step of displaying an input screen on which only the input field to be inputted by the delegate input user is made to accept the input.

3. The method according to claim 1, wherein the input reproduction file includes an operation made by the input user at the input user terminal, information of the input field assigned to the delegate input user, and information of a stop point of the reproduction processing necessary to cause the delegate input user to input to the input field assigned to the delegate input user.

4. The method according to claim 1, wherein the data processing system is connected to an application server via a network, and the business processing is carried out in the application server.

5. The method according to claim 1, wherein
   the data processing system is connected to an agent server via a network,
   the input user terminal transmits the designation of the delegate input user to the agent server, and
   the agent server transmits to the delegate input user terminal a processing request for a delegate input task of inputting data to the corresponding input field.

6. The method according to claim 1, further comprising the step of:
   the input user terminal recording a model structure including an input screen identification, an input field identification and a delegate input user identification,
   wherein the input reproduction file is created based on the recording of the terminal operation of the input user and the model structure.

7. A program product for supporting input of data necessary for performing business processing, the program, stored on a non-transitory medium, causing a client computer to execute the steps of:
   starting recording of a terminal operation of an input user;
   displaying an input screen of data necessary for the business processing, the input screen including one or more input fields and an interface for designating a delegate input user for at least one of the one or more input fields;
   receiving from the input user a designation of the delegate input user for at least one of the one or more input fields;
   starting reproduction processing of an operation at another client computer by using an input reproduction file created based on recording of a terminal operation of a user at the other client computer;
   stopping the reproduction processing and prompting the delegate input user to input data to be inputted to the input field assigned to the delegate input user;
   receiving a data input from the delegate input user to the input field for which the delegate input user is designated; and
   transmitting the inputted data from the delegate input user.

8. A data processing system comprising hardware including an input user terminal and a delegate input user terminal, each terminal comprising a display device and a user input device, the system programmed to:
- at the input user terminal, start recording of a terminal operation of an input user;
- at the input user terminal, display an input screen of data necessary for business processing, the input screen including one or more input fields and an interface for designating a delegate input user for at least one of the one or more input fields;
- at the input user terminal, receive from the input user a designation of the delegate input user for at least one of the one or more input fields;
- at the delegate input user terminal, start reproduction processing of an operation at the input user terminal by using an input reproduction file created based on the recording of the terminal operation of the input user;
- at the delegate input user terminal, stop the reproduction processing and prompting the delegate input user to input data to be inputted to the input field assigned to the delegate input user;
- at the delegate input user terminal, receive the input of the data from the delegate input user to the input field for which the delegate input user is designated; and
- at the delegate input user terminal, transmit the inputted data from the delegate input user.

9. The system according to claim 8, wherein the prompt includes display of an input screen on which only the input field to be inputted by the delegate input user is made to accept input.

10. The system according to claim 8, wherein the input reproduction file includes an operation made by the input user at the input user terminal, information of the input field assigned to the delegate input user, and information of a stop point of the reproduction processing necessary to cause the delegate input user to input to the input field assigned to the delegate input user.

11. The system according to claim 8, wherein the data processing system is connected to an application server via a network, and the business processing is carried out in the application server.

12. The system according to claim 8, wherein
the data processing system is for connection to an agent server via a network,
the input user terminal is to transmit the designation of the delegate input user to the agent server, and
the agent server is to transmit to the delegate input user terminal a processing request for a delegate input task of inputting data to the corresponding input field.

13. The system according to claim 8, wherein:
the input user terminal is to record a model structure including an input screen identification, an input field identification and a delegate input user identification,
wherein the input reproduction file is created based on the recording of the terminal operation of the input user and the model structure.

* * * * *